United States Patent
Xu et al.

(10) Patent No.: US 12,101,770 B2
(45) Date of Patent: Sep. 24, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Weijie Xu, Guangdong (CN); Shukun Wang, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 315 days.

(21) Appl. No.: 17/562,897

(22) Filed: Dec. 27, 2021

(65) Prior Publication Data

US 2022/0124771 A1    Apr. 21, 2022

Related U.S. Application Data

(63) Continuation of application No. PCT/CN2019/094760, filed on Jul. 4, 2019.

(51) Int. Cl.
*H04W 72/20*     (2023.01)
*H04W 68/02*     (2009.01)

(52) U.S. Cl.
CPC ........... *H04W 72/20* (2023.01); *H04W 68/02* (2013.01)

(58) Field of Classification Search
CPC . H04W 68/02; H04W 48/10; H04W 72/1273; H04W 72/23; H04W 76/28; H04W 48/12; H04W 72/121; H04W 72/20; H04J 2211/005; Y02D 30/70
See application file for complete search history.

(56) References Cited

U.S. PATENT DOCUMENTS

| | | | |
|---|---|---|---|
| 9,307,481 B2 | 4/2016 | Lou et al. | |
| 2016/0330679 A1* | 11/2016 | Zhang | H04W 48/10 |
| 2018/0255529 A1* | 9/2018 | Yu | H04W 48/12 |

FOREIGN PATENT DOCUMENTS

| | | |
|---|---|---|
| CN | 101902799 A | 12/2010 |
| CN | 103237350 A | 8/2013 |
| CN | 107580300 A | 1/2018 |
| EP | 3514992 A1 | 7/2019 |
| EP | 3522659 A1 | 8/2019 |
| WO | 2016121538 A1 | 8/2016 |
| WO | 2018062735 A1 | 4/2018 |

(Continued)

OTHER PUBLICATIONS

International Search Report with English Translation for PCT Application PCT/CN2019/094760 mailed Mar. 23, 2020. (4 pages).

(Continued)

*Primary Examiner* — Dady Chery
(74) *Attorney, Agent, or Firm* — Young Basile Hanlon & MacFarlane, P.C.

(57) ABSTRACT

A wireless communication method, a terminal device and a network device. The method comprises: a terminal device receiving first indication information, wherein the first indication information is used for indicating whether system information of a first cell is updated; and the terminal device determining, according to the first indication information and a first duration, whether the system information of the first cell is updated.

18 Claims, 3 Drawing Sheets

(56) References Cited

FOREIGN PATENT DOCUMENTS

WO      2018174614 A1    9/2018
WO      2018202718 A1    11/2018

OTHER PUBLICATIONS

Extended European Search Report for EP Application 19935906.8 mailed May 16, 2022. (9 pages).
Examination Report for EP Patent Application No. 19935906.8, mailed Mar. 19, 2024, 6 pages.

\* cited by examiner

200

| A terminal device receives first indication information, wherein the first indication information is used for indicating whether system information of a first cell is updated | S210 |

| The terminal device determines, according to the first indication information and a first duration, whether the system information of the first cell is updated | S220 |

| A network device sends first indication information, wherein the first indication information is used for indicating whether system information of a first cell is updated, and the first indication information is used by a terminal device to determine, according to a first time period, whether the system information of the first cell is updated | S310 |

FIG. 4

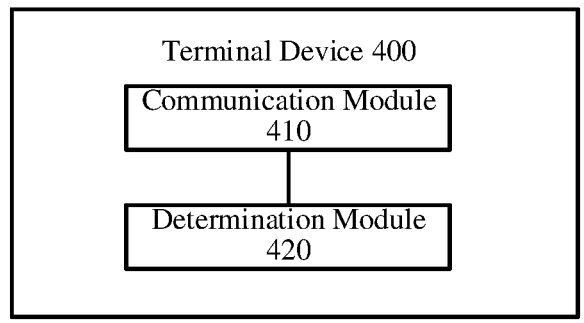

FIG. 5

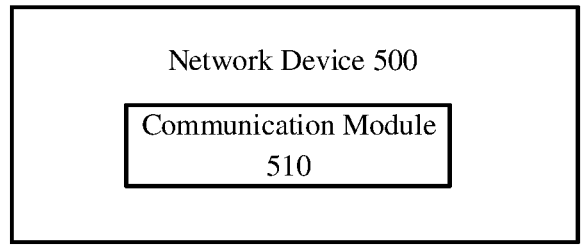

FIG. 6

WIRELESS COMMUNICATION METHOD, TERMINAL DEVICE AND NETWORK DEVICE

CROSS-REFERENCE TO RELATED APPLICATION(S)

The present application is a continuation application of International Application No. PCT/CN2019/094760, having an international filing date of Jul. 4, 2019, the entire contents of the above-identified application is hereby incorporated by reference.

TECHNICAL FIELD

Implementations of the present application relate to the field of wireless communication, and particularly to a wireless communication method, a terminal device, and a network device.

BACKGROUND

In a New Radio (NR) system, it is considered to provide communication services to users by satellite communication. All beams of a satellite's communication may use a same frequency band for communication, but adjacent beams using adjacent frequencies may cause interference to users at an edge of the beams.

In order to improve the quality of satellite communication, multi-color deployment is used, that is, adjacent beams use different frequencies to avoid interference between adjacent beams. However, the moving speed of the satellite is rather fast, which means frequent beam switching or cell switching for a terminal, which leads to that the terminal needs to frequently read system information of new cells, thereby increasing power consumption of the terminal and affects user experience.

SUMMARY

Implementations of the present application provide a wireless communication method, a terminal device and a network device, which can determine whether to read system information of a new cell according to whether the system information of the cell is updated, and further, can reuse the stored system information of the cell in a case that the system information of the cell has not been updated, which is conducive to reducing a power consumption of the terminal.

In a first aspect, a wireless communication method is provided, which includes: receiving, by a terminal device, first indication information, herein the first indication information is used for indicating whether system information of a first cell is updated; and determining, by the terminal device, according to the first indication information and a first duration, whether the system information of the first cell is updated.

In a second aspect, a wireless communication method is provided, which includes: sending, by a network device, first indication information, herein the first indication information is used for indicating whether system information of a first cell is updated, and the first indication information is used by a terminal device to determine, according to a first duration, whether the system information of the first cell is updated.

In a third aspect, a terminal device is provided, which is configured to perform the method in the above first aspect or any possible implementation mode of the first aspect. Specifically, the terminal device includes units for performing the method in the above first aspect or any possible implementation mode of the first aspect.

In a fourth aspect, a network device is provided, which is configured to perform the method in the above second aspect or any possible implementation of the second aspect. Specifically, the network device includes units for performing the method in the above second aspect or any possible implementation mode of the second aspect.

In a fifth aspect, a terminal device is provided, which includes: a processor and a memory. The memory is configured to store a computer program, and the processor is configured to call and run the computer program stored in the memory to perform the method in the above first aspect or any of various implementation modes thereof.

In a sixth aspect, a network device is provided, which includes: a processor and a memory. The memory is configured to store a computer program, and the processor is configured to call and run the computer program stored in the memory to perform the method in the above second aspect or any of various implementation modes thereof.

In a seventh aspect, a chip is provided for implementing the method according to any one of the first and second aspects or any of various implementation modes thereof.

Specifically, the chip includes a processor configured to call and run a computer program from a memory to enable a device in which the chip is installed to perform the method according to any one of the first and second aspects or any of various implementation modes thereof.

In an eighth aspect, a computer readable storage medium is provided, which is configured to store a computer program that enables a computer to perform the method according to any one of the first and second aspects or any of various implementation modes thereof.

In a ninth aspect, a computer program product is provided, which includes computer program instructions, the computer instructions enable a computer to perform the method according to any one of the first and second aspects or any of various implementation modes thereof.

In a tenth aspect, a computer program is provided, when the computer program is run on a computer, the computer program enables the computer to perform the method according to any one of the first and second aspects or any of various implementation modes thereof.

Based on the above technical solution, a terminal device can determine whether system information of a reselected new cell is updated according to first indication information in combination with a first duration. Further, when the system information of the reselected new cell is not updated, the system information of the cell does not need to be read again, while the stored system information of the cell may be reused. In this way, repeated reading of the system information can be avoided, which is conducive to reducing the power consumption of the terminal device, and improving the user experience.

BRIEF DESCRIPTION OF DRAWINGS

FIG. 3 is a schematic diagram of a wireless communication method according to an implementation of the present application.
}

FIG. 4 is a schematic diagram of a wireless communication method according to an implementation of the present application.

FIG. 5 is a schematic block diagram of a terminal device according to an implementation of the present application.

FIG. 6 is a schematic block diagram of a network device according to an implementation of the present application.

DETAILED DESCRIPTION

Technical solutions in implementations of the present application will be described below with reference to accompanying drawings in the implementations of the present application. It is apparent that the implementations described are just a part of the implementations of the present application, rather than all of the implementations of the present application. According to the implementations of the present application, all other implementations achieved by a person of ordinary skill in the art without making inventive efforts belong to the protection scope of the present application.

The technical solutions in the implementations of the present application may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunications System (UMTS), a Worldwide Interoperability for Microwave Access (WiMAX) communication system, or a 5G system, etc.

Figure 1:
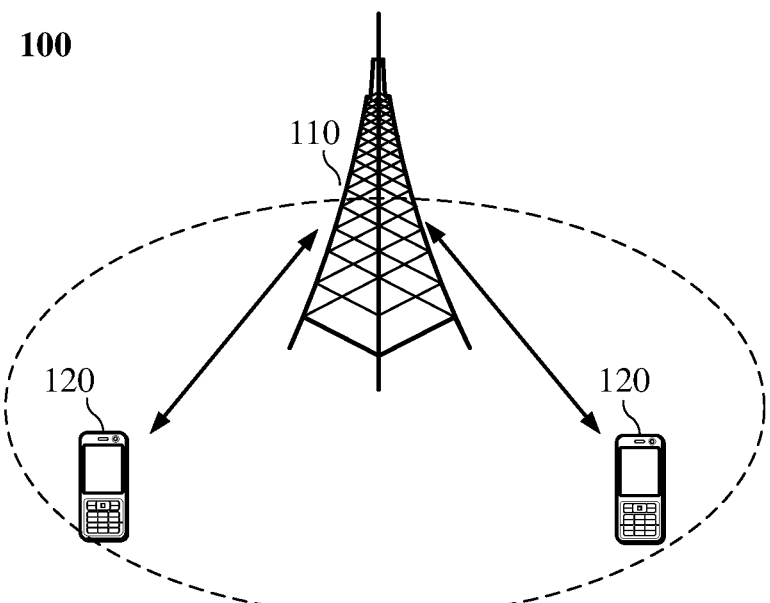
FIG. 1 is a schematic diagram of an application scene according to an implementation of the present application.

Illustratively, a communication system 100 to which an implementation of the present application is applied is shown in FIG. 1. The communication system 100 may include a network device 110. The network device 110 may be a device that communicates with terminal devices 120 (or referred to as communication terminals, or terminals). The network device 110 may provide communication coverage for a specific geographical area, and may communicate with terminal devices located within the coverage area. Optionally, the network device 110 may be a Base Transceiver Station (BTS) in a GSM system or a CDMA system, or a NodeB (NB) in a WCDMA system, or an Evolutional Node B (eNB or eNodeB) in an LTE system, or a radio controller in a Cloud Radio Access Network (CRAN), or the network device may be a mobile handover center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 further includes at least one terminal device 120 located within a coverage range of the network device 110. As used herein, the term "terminal device" includes, but is not limited to, a device configured to receive/send a communication signal via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, or an AM-FM broadcast transmitter; and/or another terminal device; and/or an Internet of Things (IoT) device. A terminal device configured to communicate via a wireless interface may be referred to as "a wireless communication terminal", "a wireless terminal", or "a mobile terminal". Examples of the mobile terminal include, but are not limited to, a satellite or cellular phone; a Personal Communications System (PCS) terminal which may combine a cellular radio phone with data processing, facsimile, and data communication abilities; a Personal Digital Assistant (PDA) that may include a radio phone, a pager, Internet/intranet access, a Web browser, a memo pad, a calendar, and/or, a Global Positioning System (GPS) receiver; and a conventional laptop and/or palmtop receiver, or another electronic apparatus including a radio phone transceiver. The terminal may refer to an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or another processing device connected to a wireless modem, a vehicle-mounted device, a wearable device, a terminal device in a 5G network, or a terminal device in a future evolved PLMN.

Optionally, Device to Device (D2D) communication may be performed between the terminal devices 120.

Optionally, the 5G system or the 5G network may also be referred to as a New Radio (NR) system or an NR network.

FIG. 1 illustrates one network device and two terminal devices. Optionally, the communication system 100 may include multiple network devices, and other number of terminal devices may be included within the coverage range of each network device, which is not limited in the implementations of the present application.

Optionally, the communication system 100 may further include another network entity, such as a network controller, a mobile management entity, or the like, which is not limited in the implementations of the present application.

It should be understood that a device with a communication function in a network/system in an implementation of the present application may also be referred to as a communication device. Taking the communication system 100 shown in FIG. 1 as an example, communication devices may include a network device 110 and terminal devices 120 which have communication functions, and the network device 110 and the terminal devices 120 may be the specific devices described above, which will not be described repeatedly herein. The communication devices may also include other devices in the communication system 100, for example other network entities, such as network controllers and mobile management entities, which are not limited in the implementations of the present application.

It should be understood that the terms "system" and "network" are often used interchangeably herein. The term "and/or" herein is an association relation describing associated objects only, indicating that three relations may exist, for example, A and/or B may indicate three cases: A alone, both A and B, and B alone. In addition, the symbol "/" in this specification generally indicates that objects before and after the symbol "/" have an "or" relation.

Figure 2:
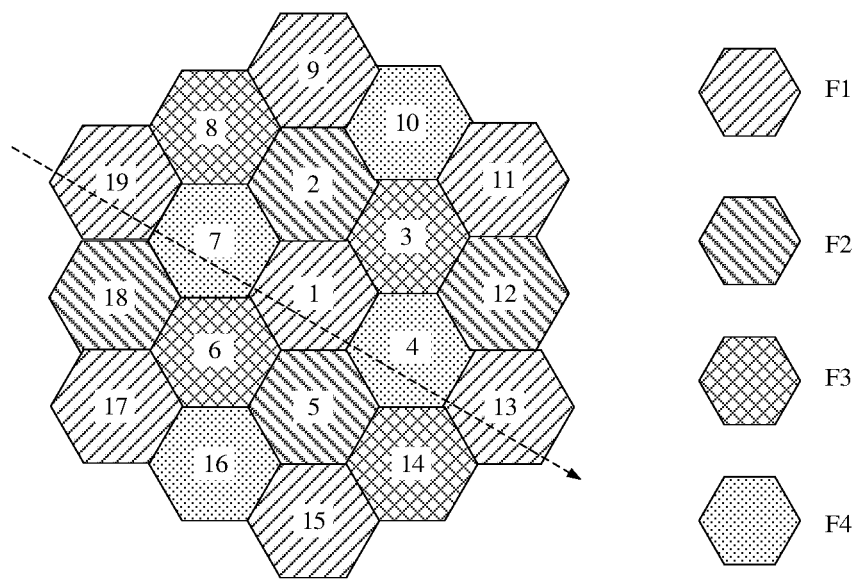
FIG. 2 is a schematic diagram of one implementation of multi-color deployment.

In an NR system, it is considered to provide communication services for users by satellite communication. Multi-color deployment is a typical way of communication satellite deployment, and the multi-color deployment can effectively avoid interference between two adjacent beams. However, some new problems may occur in satellite communication based on an NR system if the multi-color deployment is used. For a low Earth orbit satellite, because of the rapid movement of the satellite, camping time of a terminal device in one beam may only be a few seconds to tens of seconds, and terminal device is therefore faced with rapid beam switching. On the other hand, in the case of multi-color deployment, different frequencies are used for adjacent beams, and beam switching will also lead to frequency switching. For the NR system, the frequency switching means a change of a cell corresponding to the beam. For example, as shown in FIG. 2, it is assumed that the terminal device is currently located in beam 4 (which uses frequency F4, and is assumed to be corresponding to cell 4), if the satellite beam moves in the direction indicated by the arrow, the terminal device will be covered by beams 1, 7 and 19 correspondingly using F1, F4 and F1, and their corresponding cells are cell 1, cell 4 and cell 1 respectively.

For a terminal device in a disconnected state, after the cell covering the terminal device changes, the terminal device needs to select a new cell to camp on based on a cell reselection mechanism. Every time a cell is re-selected, the terminal device needs to re-acquire system information of the cell, such as RMSI. Therefore, the rapid change of the coverage cell eventually leads to that the terminal device needs to frequently read system information of new cells, which increases the power consumption of the terminal device and brings great challenges to standby time of the terminal device.

FIG. 3 is a schematic flow chart of a wireless communication method according to an implementation of the present application. As shown in FIG. 3, the method 300 may include at least part of the following contents.

In S210, a terminal device receives first indication information, herein the first indication information is used for indicating whether system information of a first cell is updated.

In S220, the terminal device determines, according to the first indication information and a first duration, whether the system information of the first cell is updated.

It should be understood that the method 300 of the implementation of the present application may be applied to a satellite communication scene with multi-color deployment, or other scenes with frequent cell switching or frequent beam switching. The following description takes the satellite communication scene with multi-color deployment as an example, but the implementation of the present application is not limited thereto.

It may be seen from a trajectory of a satellite that although the frequent switching of satellite beams causes the terminal device to reselect cells quickly and frequently, the terminal device always reselects cells within a limited number of cells. For example, in the scene shown in FIG. 2, terminal device usually make a reselection among cell 1 (using frequency F1), cell 2 (using frequency F2), cell 3 (using frequency F3) and cell 4 (using frequency F4). Therefore, in the implementation of the present application, the terminal device may store the read system information of cells. For example, in the scene shown in FIG. 2, the terminal device may store the system information of cells 1 to 4. After the terminal device reselects to a cell whose system information has been stored, the terminal device may first determine whether the system information of the cell is updated. If the system information of the cell is not updated, the terminal device may directly use the stored system information, i.e. reuse the stored system information of the cell, instead of reading the system information of the cell again, thus avoiding reading the system information of the cell and reducing the power consumption of the terminal device.

In the implementation of the present application, the terminal device is in a disconnected state, such as an IDLE state, an Inactive state, or a Suspend state. For a terminal device in the disconnected state, in a case that the cell or beam covering the terminal device is changed, the terminal device may select a new cell for camping. For example, the terminal device may select a new cell for camping based on a cell reselection mechanism, which may adopt an existing implementation mode, and the specific implementation is not described repeatedly here. After the terminal re-locates to a new cell, for example, re-selects to the first cell, it needs to acquire system information of a first cell, such as a Master Information Block (MIB), Remaining System Information (RMSI), a System Information Block (SIB), paging message, Random Access Response (RAR) message, etc.

Optionally, in the implementation of the present application, the system information of the first cell may include at least one of MIB, RMSI and other system information, such as SIB2-SIB5. In a satellite communication scene with multi-color deployment, multiple cells corresponding to multiple beams of a satellite may be considered as one region. In the implementation of the present application, the system information does not have to include regional system information of the region, but may include cross-regional system information.

In the implementation of the application, the terminal device may receive first indication information, wherein the first indication information may be used for indicating whether the system information of the first cell is updated. The terminal device is further configured with a first duration, and the terminal device may determine whether the system information of the first cell is updated within a specific time window according to the first indication information and the first duration, wherein the length of the specific time window is the first duration.

In some implementations, the first duration may be a duration during which the system information of the first cell remains unchanged, that is, the system information of the first cell is not updated within the first duration. Or, the first duration may be a valid duration of the first indication information, that is, it is valid that the system information of the first cell indicated by the first indication information is not updated within the first duration.

Optionally, in an implementation of the present application, the first duration is predefined, preset or configured by a network device.

For example, the first duration may be configured by system information, Radio Resource Control (RRC) signaling or DCI. Optionally, the system information is MIB or Residual Minimum System Information (RMSI).

Optionally, in some implementations, the first indication information and the first duration may be carried by the same information or signaling, for example, both the first indication information and the first duration may be carried in a MIB or a PDCCH scheduling RMSI, or may be carried by different information or signaling, for example, the first indication information is carried by a MIB and the first duration is carried by DCI of a PDCCH, which is not limited in the implementations of the present application.

Optionally, in some implementations, the first duration is greater than or equal to a duration between the last time the terminal device left the first cell and the time when the terminal device reselected to the first cell. That is, during the period from the time when terminal device left the first cell to time when the terminal device returned to the first cell, the system information of the first cell has not been updated, or the system information of the first cell stored by the terminal device may be reused. In this case, it may be considered that the system information of the first cell stored by the terminal device is valid.

Optionally, in some implementations, the first indication information may be sent by the network device in the first cell, which is denoted as Implementation 1. Specifically, after reselecting to the first cell, the terminal device may receive the first indication information sent by a network device in the first cell, and further determine whether the system information of the first cell is updated according to the first indication information in combination with the first duration.

Optionally, in some other implementations, the first indication information may be sent by a network device in a second cell, which is denoted as Implementation 2. Optionally, the second cell may be a cell adjacent to the first cell. For example, the second cell may be a cell where the terminal device camped on previously before reselecting to the first cell. When the terminal device camps on the second cell, the network device of the second cell may know an update status of system information in the first cell and further inform the terminal device through the first indication information. In this way, after reselecting to the first cell, the terminal device may determine whether to reacquire the system information of the first cell according to the first indication information.

Hereinafter, the description will be combined with specific implementations, and the manner of carrying the first indication information and determining whether the system information of the first cell is updated in Implementation 1 and Implementation 2 will be described respectively.

Implementation 1: the terminal device may receive the first indication information sent by the network device of the first cell, and determine whether the system information of the first cell is updated according to the first indication information.

In Implementation 1, the terminal device determines, according to the first indication information and a first duration, whether the system information of the first cell is updated, includes: if the first indication information indicates that the system information of the first cell is not updated, the terminal device determines that the system information of the first cell is not updated within a first time window, herein the length of the first time window is the first duration.

Optionally, a time position of the first time window is determined based on a time position of the first indication information.

Optionally, the time position of the first time window includes an end time and/or a start time of the first time window, and the time position of the first indication information includes a receiving time of the first indication information. That is, the terminal device may determine the position of the first time window according to the receiving time of the first indication information in combination with the first duration. For example, the terminal device may determine the receiving time of the first indication information as the end time of the first time window, that is, the system information of the first cell may be considered as not updated within the first duration before the receiving time of the first indication information. Or, the terminal device may also determine the receiving time of the first indication information as the starting time of the first time window, that is, the system information of the first cell may be considered as not updated within the first duration after the receiving time of the first indication information.

In a specific implementation, the end time of the first time window is the receiving time of the first indication information. In this way, after the terminal device receives the first indication information, if the first indication information indicates that the system information of the first cell is not updated, the terminal device may determine that the system information of the first cell is not updated within the first duration before the receiving time of the first indication information.

In this case, if the time when the terminal device read the system information of the first cell last time is within the first time window, that is, the system information of the first cell stored by the terminal device is valid, the terminal device may determine that it is not necessary to read the system information of the first cell again, and may further reuse the stored system information of the first cell, for example, it may perform subsequent operations such as cell search, downlink time-frequency synchronization or RRM measurement according to the system information of the first cell. Alternatively, if the time when the terminal device read the system information of the first cell last time is not within the first time window, that is, the system information of the first cell stored by the terminal device is invalid, the terminal device may determine that it is necessary to read the system information of the first cell again, and may further receive the system information of the first cell.

Hereinafter, the manner of carrying the first indication information will be described with reference to Implementations 1-1 to 1-3.

Implementation 1-1: the first indication information may be carried in a MIB.

As an example, K bits may be set in the MIB, wherein K is a positive integer. These K bits may be newly added bits or reserved bits in the MIB. These K bits indicate whether the system information of the first cell is updated or not, wherein the K bits take a first value for indicating that the system information of the first cell is updated, or the K bits take a second value for indicating that the system information of the first cell is not updated, and the first value is different from the second value. For example, the K bits may be one bit, and a value of 0 of the bit indicates that the system information of the first cell is not updated, and a value of 1 of the bit indicates that the system information of the first cell is updated, or vice versa.

In this way, after returning to the first cell, the terminal device may acquire a MIB in a Physical Broadcast Channel (PBCH), and further acquire the first indication information carried in the MIB to determine whether the system information of the first cell is updated based on the first indication information and the first duration, so as to further determine whether to receive other system information except the MIB in the first cell.

For example, if the first indication information indicates that the system information of the first cell is not updated, and the terminal device determines that the stored system information of the first cell is valid according to the first duration, the terminal device does not have to receive other subsequent system information, such as Physical Downlink Control Channel (PDCCH) for scheduling RMSI, a Physical Downlink Shared Channel (PDSCH) for transmitting RMSI, and other system information, such as SIB2-SIB5.

For another example, if the first indication information indicates that the system information of the first cell is updated, or if the first indication information indicates that the system information of the first cell is not updated, but it is determined according to the first duration that the system information of the first cell stored by the terminal device is invalid, the terminal device may receive other subsequent system information, such as such as Physical Downlink Control Channel (PDCCH) for scheduling RMSI, Physical Downlink Shared Channel (PDSCH) for transmitting RMSI, and other system information, such as SIB2-SIB5.

Implementation 1-2: the first indication information may include scrambling code information of PBCH, that is, the scrambling code information of PBCH may be used for indicating whether the system information of the first cell is updated.

For example, if the scrambling code of the PBCH is a first scrambling code for indicating that the system information of the first cell is not updated, the scrambling code of the PBCH is other scrambling codes besides the first scrambling code, such as a second scrambling code for indicating that the system information of the first cell is updated.

Optionally, in an implementation of the present application, the scrambling code information of the PBCH is generated according to specific information, the first scrambling code is determined by specific information taking a first information value, and the second scrambling code is determined by the specific information taking a second information value, wherein the first information value is different from the second information value. That is, the information used for generating the first scrambling code and the information used for the second scrambling code is different.

Scrambling sequence of PBCH may be expressed by $S_i$, assuming that an original bit sequence of PBCH is $a_i$ and a scrambled bit sequence is $a'_i$, here i=0, 1, 2, ..., A-1, A is the length of bit sequence of PBCH. $a_0, a_1, a_2, a_3, \ldots, a_{A-1}$ corresponds to different bits respectively, and different bits may be used for indicating different contents.

The network device may scramble the original load sequence $a_i$ of PBCH according to the scrambling sequence $S_i$ to obtain the scrambled load sequence $a'_i$, and send the scrambled load sequence $a'_i$ to the terminal device. After receiving the load sequence $a'_i$ sent by the network device, the terminal may descramble the load sequence $a''$ by using the scrambling code sequence $S_i$ to obtain the original load sequence $a_i$.

The manner of determining $a'_i$ according to $a_i$ and $S_i$ is not specifically limited in the implementations of the present application. For example, $a'_i$ may be determined by the following formula 1.

$$a'_i = (a_i + s_i) \bmod 2 \qquad \text{Formula 1}$$

Herein, mod stands for modulo operation. Formula 1 is only an example, $a'_i$ may also be determined by other formulas.

The generation mode of scrambling code sequence $S_i$ is not limited in the implementations of the present application. For example, the scrambling code sequence $S_i$ may be determined according to the gold sequence $c(n)$, and $c(n)$ may be determined by the following Formula 2.

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \qquad \text{Formula 2}$$

In which Nc is a fixed value, for example, Nc may be 1600.

As an example, an initial value is $x_1(0)=1$, $x_1(n)=0$, n=1, 2, ..., 30. Under the condition that a System Frame Number (SFN) satisfies mod(SFN,8)=0, when n is an integer less than or equal to 30, the initial value of x2(n) $c_{init} = N_{ID}^{cell}$, and $N_{ID}^{cell}$ represent an Identity (ID) of the cell, that is, when n is an integer less than or equal to 30, the values of x2(n) are all the same, which is a fixed value.

The value of $c_{init}$ may be related to the cell where the terminal device is located, for example, the value of $c_{init}$ may be equal to the ID of the cell where the terminal device is located.

In the implementation of the present application, the first scrambling code and the second scrambling code may be obtained by different operations according to the gold sequence c(n), or may be obtained by the same operation according to the gold sequence c(n), wherein the gold sequence c(n) has different values.

As an example, it is assumed that the scrambling code sequence $S_i$ of the first scrambling code and that of the second scrambling code are both generated by the following Formula 3.

$$s_i = c(j+q) \qquad \text{Formula 3}$$

For the first scrambling code and the second scrambling code, the values of q may be different, so that the obtained values of c(j+q) are different, and the first scrambling code and the second scrambling code must also be different. Or, the values of q may be the same, but the initial values of gold sequence c(n) are different, therefore the obtained first scrambling code and second scrambling code will also be different. Or, if the value of q and the initial value of gold sequence c(n) are different, the obtained first scrambling code and second scrambling code will also be different.

Hereinafter, a specific manner of determining the first scrambling code and the second scrambling code will be described.

Mode 1: The initial values for generating gold sequences c(n) of the first scrambling code and the second scrambling code are different.

Formula 2 shows that the initial value of c(n) is related to the initial values of x1(n) and x2(n), so different initial values of x1(n) and x2(n) may be defined for the first scrambling code and the second scrambling code respectively.

Taking different initial values of x2(n) as an example, if the initial values of x2(n) are different, the value range of the initial value $c_{init}$ used for generating the first scrambling code may be different from the value range of the initial value $c_{init}$ used for generating the second scrambling code. For example, a minimum value of the initial value $c_{init}$ used for generating the second scrambling code is greater than a maximum value of the initial value $c_{init}$ used to generate the first scrambling code, so that the generated second scrambling code will not be the same as the generated first scrambling code regardless of the value of $c_{init}$ used for generating the second scrambling code.

Optionally, the minimum value of the initial value $c_{init}$ used for generating the second scrambling code may represent a minimum value of all values of $N_{ID}^{cell}$ that may be used when generating the second scrambling code, and the maximum value of the initial value $c_{init}$ used to generate the first scrambling code represents the maximum value of all $N_{ID}^{cell}$ values that may be used when generating the first scrambling code.

In some implementations, if the SFN satisfies mod(SFN, 8)=0, an initial value of x2(n) corresponding to the first scrambling code is $c_{init}$, $c_{init}=N_{ID}^{cell}$, and $N_{ID}^{cell}$ indicates the cell ID, then an initial value of x2(n) corresponding to the second scrambling code may be $c_{init}$ plus the first offset. Optionally, the first offset may be configured by the network device, or may also be pre-configured.

In some implementations, if an value range of $N_{ID}^{cell}$ is 0-1023, it may be set that the initial value $c_{init}$ of x2(n) corresponding to the second scrambling code may be greater than 1023, that is, the initial value of x2(n) used for generating the second scrambling code is greater than or equal to 1024, for example, the first offset may be set to be 1024.

Mode 2: The values of q used for generating the first scrambling code and the second scrambling code are different.

As an implementation of Mode 2, the value of q used for generating the second scrambling code is obtained by adding a second offset based on the value of q used for generating the first scrambling code. That is, input parameters for generating the gold sequences c(n) of the first scrambling code and the second scrambling code are different.

For example, the second offset may be an integer greater than 0 or an integer less than 0. As long as the second offset is not equal to 0, the scrambling code sequences obtained from the gold sequences c(n) are different.

For example, the second offset may be greater than or equal to the maximum value of q used for generating the first scrambling code, so the minimum value of q used for generating the second scrambling code is also greater than the maximum value of q used for generating the first scrambling code. In this way, the scrambling code sequences $s_i$ obtained by different q are different.

Given q=vM, then $$s_i = c(j+vM) \quad \text{Formula 4}$$

Herein, M may be determined according to the length A of PBCH load sequence and the number L of SSBs.

The value of L may be 4, 8, 64, and when L=4 or L=8, M=A−3; When L=64, M=A−6.

If the first scrambling code is obtained according to Formula 4, that is, the input parameter n is j+vM, then the second scrambling code may be obtained according to the following Formula 5, that is, the input parameter n is j+vM+x.

$$s_i = c(j+vM+x) \quad \text{Formula 5}$$

Herein, x may represent a second offset. The value of x may be predefined, and the value of x may be an integer greater than or equal to 96, for example.

Generally, the length of PBCH load sequence is less than or equal to 24, hence A≤24, so the maximum value of i is 23; for the first scrambling code, the maximum value of v is 3 and the maximum value of M is 24, so the maximum value of n in the obtained gold sequence c(n) is 96. Therefore, the value of the second offset x may be greater than or equal to 96, so that the scrambling code sequences obtained by Formula 4 and Formula 5 may be different.

In the aforementioned Formula (4), the value of q may be determined according to v, where v is determined according to the second and third Least Significant Bits (LSB) of the system frame number SFN carried by PBCH. In the bit sequence of SFN, the rightmost bit is the least significant bit, and the leftmost bit is the most significant bit. From left to right, the importance decreases in turn. Therefore, the second and third bits counted from right to left may be understood as the second and third least significant bits described in the implementation of the present application.

As another implementation of Mode 2, the value of v used for generating the first scrambling code is different from the value of v used for generating the second scrambling code.

For example, the first scrambling code is generated according to a first value of v, and the second scrambling code is generated according to a second value of v, wherein the first value of v and the second value of v are different.

As an example, the first value of v is determined according to a first mapping relationship, and the second value of v is determined according to a second mapping relationship, wherein the first mapping relationship and the second mapping relationship are mapping relationships between the second and third least significant bits of SFN and the values of v; wherein, for the same second and third least significant bits, the corresponding values of v in the first mapping relationship and the second mapping relationship are different.

Table 1 and Table 2 show an example of the first mapping relationship and the second mapping relationship, respectively.

TABLE 1

| Second and third least significant bits of SFN | Value of v |
|---|---|
| (0, 0) | 0 |
| (0, 1) | 1 |
| (1, 0) | 2 |
| (1, 1) | 3 |

TABLE 2

| Second and third least significant bits of SFN | Value of v |
|---|---|
| (0, 0) | 4 |
| (0, 1) | 5 |
| (1, 0) | 6 |
| (1, 1) | 7 |

The first value of v for generating the first scrambling code may be obtained from Table 1, and the second value of v for generating the second scrambling code may be obtained from Table 2. Thus, different values of gold sequence c(n) may be obtained through different values of v, thus obtaining different scrambling code sequences $S_i$.

Table 2 is only an example, and the value of the second value of v used for generating the second scrambling code is not limited to the value in Table 2, as long as the first value of v and the second value of v obtained are different in the second and third least significant bits of the same SFN.

For example, the minimum value of the second value of v used for generating the second scrambling code is greater than the maximum value of the first value of v used for the first scrambling code.

For example, a value of the second value of v for generating the second scrambling code may also be obtained from Table 3.

TABLE 3

| Second and third least significant bits of SFN | Value of v |
|---|---|
| (0, 0) | 3 |
| (0, 1) | 2 |
| (1, 0) | 1 |
| (1, 1) | 0 |

According to Table 1 and Table 3, it may be seen that even for the second and third least significant bits of the same SFN, the obtained first value of v and second value of v are different. For example, for the second and third least significant bits (0,0) of SFN, the second value of v for generating the second scrambling code is 3, and the first value of v for generating the first scrambling code is 0, so that the obtained first scrambling code and second scrambling code are different according to different values of v.

Of course, the value of the second value of v used for generating the second scrambling code is not limited to the forms in Table 2 and Table 3, but may also be in other forms, which is not specifically limited in the implementation of the present application.

For convenience of understanding, the method of the implementation of the present application will be described in detail with specific examples below.

An original load sequence of PBCH is $a_0, a_1, \ldots, a_{A-1}$, and a sequence scrambled by scrambling sequence $s_i$ is $a'_0, a'_1, \ldots, a'_{A-1}$, where $a'_i=(a_i+s_i)\mod 2$, A indicates the length of the load sequence of PBCH. A scrambling code sequence $s_0, s_1, \ldots, s_{A-1}$ may be generated by the following script formula:

i=0;
j=0;
While i<A;
  If $a_i$ corresponds to the index of SSB, the half frame index or the second and third least significant bits of SFN:
    $s_i=0$;
  Otherwise,
    $s_i=c(j+vM)$;
    j=j+1;
  end if
  i=i+1;
end while.

In which, c(n) is a gold sequence, and the value of c(n) may be obtained by the above Formula 2.

In Formula 2, Nc=1600, the initial values x1(0)=0, x1(n)=0, n=1, 2, . . . , 30. Under the condition that SFN satisfies mod(SFN,8)=0, the initial values of x2(n) $c_{init}=N_{ID}^{cell}$, $N_{ID}^{cell}$ represents the cell ID.

M=A−3 when L=4 or L=8; when L=64, M=A−6, where L represents the number of SSBs.

The v may be determined based on the second and third least significant bits of SFN carried by the PBCH. As shown in Tables 1-3 above.

The first scrambling code and the second scrambling code may be generated as follows:

1. The initial values of x2(n) are different. The initial value of x2(n) for generating the second scrambling code may be obtained by adding an offset to the initial value of x2(n) for generating the first scrambling code, wherein the offset may be predefined, for example, the offset is an integer greater than or equal to 1024.

2. Gold sequences c(n) are different. The first scrambling code may be generated by the gold sequence c(n) of Formula 4, and the second scrambling code may be generated by the gold sequence c(n) of Formula 5. The offset x is predefined, and may be an integer greater than or equal to 96, for example.

3. The values of v for generating the first scrambling code and the second scrambling code are different. Specifically, for the second and third least significant bits of the same SFN, the value of v used for generating the first scrambling code is different from the value of v used for generating the second scrambling code. For example, the first value of v for generating the first scrambling code may be determined by Table 1, and the second value of v for generating the second scrambling code may be determined by Table 2 or Table 3.

Implementations 1-3: first indication information is carried in a Physical Downlink Control Channel (PDCCH).

As an implementation, the first indication information may be carried in a PDCCH for scheduling RMSI or in a PDCCH for scheduling paging messages.

Optionally, the first indication message may be carried in Downlink Control Information (DCI) of a PDCCH.

For example, N bits may be set in the DCI, where N is a positive integer, and the N bits are used for indicating whether the system information of the first cell is updated. The N bits may be newly added bits or reserved bits in the DCI. For example, the N bits take a first value for indicating that the system information of the first cell is updated, or the N bits take a second value for indicating that the system information of the first cell is not updated, wherein the first value is different from the second value. For example, the N bits may be one bit, and a value of 0 of the bit indicates that the system information of the first cell is not updated, and a value of 1 of the bit indicates that the system information of the first cell is updated, or vice versa.

In this way, after the terminal device returns to the first cell, it may receive the PDCCH, further acquire the first indication information carried in the PDCCH, then determine whether the system information of the first cell is updated according to the first indication information in combination with the first duration, then further determine whether to receive subsequent system information in the first cell.

For example, if the first indication information indicates that the system information of the first cell is not updated, and the terminal device determines that the stored system information of the first cell is valid according to the first duration, the terminal device does not have to receive other subsequent system information, such as a PDSCH for transmitting RMSI, and other system information, such as SIB2-SIB5.

For another example, if the first indication information indicates that the system information of the first cell is updated, or if the first indication information indicates that the system information of the first cell is not updated, but it is determined according to the first duration that the system information of the first cell stored by the terminal device is invalid, the terminal device may receive other subsequent system information, such as such as a Physical Downlink Shared Channel (PDSCH) for transmitting RMSI, and other system information, such as SIB2-SIB5.

The detailed implementation of Implementation 1 has been described above, and the detailed implementation of Implementation 2 will be described below.

Implementation 2: the terminal device may receive the first indication information sent by a network device of a second cell, and determine whether the system information of the first cell is updated according to the first indication information.

Optionally, the second cell may be a cell adjacent to the first cell. For example, the second cell may be a cell where the terminal device camped on before reselecting to the first cell.

In a scene with multi-color deployment, since among multiple cells covered by a satellite, an update status of system information of other cells may be known for the same satellite, in a case that the terminal device camps on the second cell, the network device of the second cell may know the update status of system information in the first cell and further inform the terminal device through the first indication information. In this way, after the terminal device reselects to the first cell, it may determine whether to reacquire the system information of the first cell according to the first indication information.

Optionally, in Implementation 2, the terminal device may also determine, according to the first indication information in combination with the first duration, whether the system information of the first cell is updated.

If the first indication information indicates that the system information of the first cell is not updated, the terminal device may determine that the system information of the first cell is not updated within a second time window, wherein a length of the second time window is the first duration; or
if the first indication information indicates that the system information of the first cell is updated, the terminal device may determine that it is necessary to read the system information of the first cell again.

In Implementation 2, a time position of the second time window is determined based on a time position of the first indication information.

Optionally, the time position of the second time window includes an end time and/or a start time of the first time window, and the time position of the first indication information includes a receiving time of the first indication information. That is, the position of the second time window may be determined according to the receiving time of the first indication information in combination with the first duration.

As an example, the terminal device may determine the receiving time of the first indication information as the end time of the second time window, that is, the system information of the first cell may be considered as not updated within the first duration before the receiving time of the first indication information.

In this way, after the terminal device receives the first indication information, if the first indication information indicates that the system information of the first cell is not updated, the terminal device may determine that the system information of the first cell is not updated within the first duration before the receiving time of the first indication information.

Furthermore, if the time when the terminal device read the system information of the first cell last time is within the second time window, that is, the system information of the first cell stored by the terminal device is valid, if the terminal device has not received the first indication information indicating that the system information of the first cell is updated before reselecting to the first cell, it may be determined that there is no need to read the system information of the first cell again after reselecting to the first cell, and the stored system information of the first cell may be reused. For example, it may perform subsequent operations such as cell search, downlink time-frequency synchronization or RRM measurement according to the system information of the first cell.

Alternatively, if the time when the terminal device read the system information of the first cell last time is not within the second time window, that is, the system information of the first cell stored by the terminal device is invalid, or the terminal device receives first indication information indicating that the system information of the first cell is updated before reselecting to the first cell, the terminal device may determine that it is necessary to read the system information of the first cell again, and may further receive the system information of the first cell.

As another implementation, the terminal device may also determine the receiving time of the first indication information as a starting time of the second time window, that is, the system information of the first cell may be considered as not updated within the first duration after the receiving time of the first indication information.

In this way, after the terminal device receives the first indication information, if the first indication information indicates that the system information of the first cell is not updated, the terminal device may determine that the system information of the first cell is not updated within the first duration after the receiving time of the first indication information. If the terminal device reselects to the first cell for the first time within the second time window, the terminal device may read and store the system information of the first cell. If the terminal device reselects to the first cell again within the second time window, the terminal device may determine that it is unnecessary to read the system information of the first cell again, and may reuse the stored system information of the first cell. For example, the terminal device may perform subsequent operations such as cell search, downlink time-frequency synchronization or RRM measurement according to the system information of the first cell.

Optionally, in implementation 2, the first indication information may be carried in downlink channels such as PDSCH or PDCCH or downlink signals.

As an implementation, the first indication information may be carried in a PDSCH for transmitting paging messages or a PDCCH for scheduling paging messages, for example, in the DCI of the PDCCH.

For example, P bits may be set in the DCI of the PDSCH or PDCCH, wherein P is a positive integer, and the P bits are used for indicating whether the system information of the first cell is updated. The P bits may be newly added bits or reserved bits. For example, the P bits take a first value for indicating that the system information of the first cell is updated, or the P bits take a second value for indicating that the system information of the first cell is not updated, wherein the first value is different from the second value. For example, the P bits may be one bit, and a value of 0 of the bit indicates that the system information of the first cell is not updated, and a value of 1 of the bit indicates that the system information of the first cell is updated, or vice versa.

In this implementation of the application, the terminal device is configured with multiple durations, and the multiple durations include the first duration. For example, the multiple durations may include 20 s, 40 s, 80 s and 120 s.

Optionally, the multiple durations are configured by a network device or pre-configured.

For example, the multiple durations are configured through broadcast signaling, RRC signaling or DCI.

Further, in some implementations, the method 200 further includes: the terminal device receiving an activation signaling, wherein the activation signaling is used for activating the first duration among the multiple durations.

Optionally, the activation signaling is DCI or Media Access Control Control Element (MAC CE).

For example, an indication field may be set in the DCI, which is used for indicating one of the multiple durations. For example, the indication field may be 2 bits, and each of the multiple durations may be indicated by different values of the 2 bits. For example, the 2 bits take a value of 00 indicating that the duration is 20 s, the 2 bits take a value of 01 indicating that the duration is 40 s, the 2 bits take a value of 10 indicating that the duration is 80 s, or the 2 bits take a value of 11 indicating that the duration is 120 s. This indication mode is only an example, and other modes may be used for indication, which is not limited in the implementations of the present application.

Therefore, according to the wireless communication method of the implementation of the present application, the terminal device may determine whether the system information of the reselected new cell is updated according to the first indication information in combination with the first duration. Further, in a case that the system information of the reselected new cell is not updated, the system information of the cell does not need to be read again, while the stored system information of the cell may be reused. In this way, repeated reading of the system information may be avoided, which is conducive to reducing the power consumption of the terminal device, and improving the user experience.

The wireless communication method according to an implementation of the present application is described in detail above from a perspective of the terminal device with reference to FIG. 3. Next, a wireless communication method according to another implementation of the present application will be described in detail from a perspective of the network device with reference to FIG. 4. It should be understood that the description of the network device side corresponds to the description of the terminal device side, and similar description may refer to the above description, which will not be repeated herein for brevity.

FIG. 4 is a schematic flow chart of a wireless communication method 300 according to another implementation of the present application. The method 300 may be implemented by the network device in the communication system shown in FIG. 1. As shown in FIG. 4, the method 300 includes the following contents.

In S310, a network device sends first indication information, herein the first indication information is used for indicating whether system information of a first cell is updated, and the first indication information is used by a terminal device to determine, according to a first duration, whether the system information of the first cell is updated.

Optionally, in some implementations, the first indication information is carried in a main information block (MIB).

Optionally, in some implementations, the first indication information includes K bits, wherein the K bits take a first value for indicating that the system information of the first cell is updated, or the K bits take a second value for indicating that the system information of the first cell is not updated, wherein the first value is different from the second value, and K is a positive integer.

Optionally, in some implementations, the first indication information includes scrambling code information of a Physical Broadcast Channel (PBCH).

Optionally, in some implementations, the scrambling code of the PBCH is a first scrambling code for indicating that the system information of the first cell is not updated, or the scrambling code of the PBCH is a second scrambling code for indicating that the system information of the first cell is updated, wherein the second scrambling code is different from the first scrambling code.

Optionally, in some implementations, the scrambling code information of the PBCH is generated according to specific information, the first scrambling code is determined by the specific information taking a first information value, and the second scrambling code is determined by the specific information taking a second information value, wherein the first information value is different from the second information value.

Optionally, in some implementations, the specific information includes an initial value of a gold sequence $c(n)$ for generating a scrambling code sequence of the PBCH, wherein n is an integer.

Optionally, in some implementations, the first information value is $N_{ID}^{cell}$, $N_{ID}^{cell}$ is an Identity (ID) of a cell, and the second information value is $N_{ID}^{cell}$ plus a first offset.

Optionally, in some implementations, the first offset is preset.

Optionally, in some implementations, the specific information includes an input parameter of the gold sequence $c(n)$ for generating a scrambling code sequence $S_i$ of the PBCH, where i=0, 1, 2, . . . , A−1, where A is a length of the scrambling code sequence of the PBCH and n is an integer.

Optionally, in some implementations, the specific information is the input parameter n of $c(n)$, the first information value is j+vM and the second information value is j+vM+x, wherein x is a second offset, where j=0, 1, 2, . . . , A−1, and M is determined according to A and the number of synchronization signal blocks SSB. The value of v is determined according to the second and third least significant bits of a system frame number (SFN) carried by the PBCH.

Optionally, in some implementations, the second offset is preset.

Optionally, the specific information is the value of v in the input parameter of $c(n)$, the first information value is a first value of v, and the second information value is a second value of v, wherein the first value of v is different from the second value of v, and the value of v is determined according to the second and third least significant bits of the system frame number (SFN) carried by the PBCH.

Optionally, in some implementations, the first value of v is determined according to a first mapping relation, and the second value of v is determined according to a second mapping relation, wherein the first mapping relation and the second mapping relation are mapping relations between the second and third least significant bits of the SFN and values of v; wherein for the same second and third least significant bits, the corresponding values of v in the first mapping relation and the second mapping relation are different.

Optionally, in some implementations, the first indication information is carried in a Physical Downlink Control Channel (PDCCH).

Optionally, in some implementations, the PDCCH is a PDCCH for scheduling the System Information Block (SIB).

Optionally, the Downlink Control Information (DCI) of the PDCCH includes the first indication information.

Optionally, if the first indication information is used for indicating that the system information of the first cell is not updated, a first duration is used for determining a first time window, wherein a length of the first time window is the first duration.

Optionally, a time position of the first time window is determined based on a time position of the first indication information.

Optionally, in some implementations, the time position of the first time window includes an end time of the first time window, the time position of the first indication information includes a receiving time of the first indication information, and the end time of the first time window is the receiving time of the first indication information.

Optionally, in some implementations, the network device is a network device in the first cell.

Optionally, in some implementations, the first indication information is carried in a Physical Downlink Shared Channel (PDSCH) or a PDCCH for scheduling paging messages.

Optionally, in some implementations, the PDSCH is a PDSCH for transmitting paging messages.

Optionally, the network device is a network device of a second cell, wherein the second cell is different from the first cell.

Optionally, if the first indication information is used for indicating that the system information of the first cell is not updated, the first duration is used for determining a second time window, wherein the length of the second time window is the first duration.

Optionally, a time position of the second time window is determined based on the time position of the first indication information.

Optionally, in some implementations, the time position of the second time window includes an end time of the second time window, the time position of the first indication information includes the receiving time of the first indication information, and the end time of the second time window is the receiving time of the first indication information.

Optionally, in some implementations, the time position of the second time window includes a starting time of the second time window, the time position of the first indication information includes the receiving time of the first indication information, and the starting time of the second time window is the receiving time of the first indication information.

Optionally, in some implementations, the first duration is preset or configured by a network device.

Optionally, the first duration is configured through system information, Radio Resource Control (RRC) signaling or DCI.

Optionally, the system information is MIB or Residual Minimum System Information (RMSI).

Optionally, the terminal device is configured with multiple durations, and the multiple durations include the first duration.

Optionally, the multiple durations are configured by the network device or pre-configured.

Optionally, the multiple durations are configured through broadcast signaling, RRC signaling or DCI.

Optionally, in some implementations, the method further includes: the network device sends an activation signaling, wherein the activation signaling is used for activating the first duration among the multiple durations.

Optionally, in some implementations, the activation signaling is DCI.

Optionally, in some implementations, the first duration is greater than or equal to a duration between the last time when the terminal device left the first cell and the time when the terminal device reselected to the first cell.

Optionally, in some implementations, the system information of the first cell includes at least one of the following: MIB, RMSI and other system information.

Method implementations of the present application are described in detail above with reference to FIGS. 3 to 4, device implementations of the present application will be described in detail below with reference to FIGS. 5 to 9. It should be understood that the device implementations and the method implementations correspond to each other, and description of the method implementations may be referred to for similar description of the apparatus implementations.

FIG. 5 is a schematic block diagram of a terminal device 400 according to an implementation of the present application. As shown in FIG. 5, the terminal device 400 includes:

a communication module 410 configured to receive first indication information, wherein the first indication information is used for indicating whether system information of a first cell is updated; and a determination module 420 configured to determine, according to the first indication information and a first duration, whether the system information of the first cell is updated.

Optionally, in some implementations, the first indication information is carried in a main information block (MIB).

Optionally, the first indication information includes K bits, wherein the K bits take a first value for indicating that the system information of the first cell is updated, and the K bits take a second value for indicating that the system information of the first cell is not updated, wherein the first value is different from the second value, and K is a positive integer.

Optionally, in some implementations, the first indication information includes scrambling code information of a Physical Broadcast Channel (PBCH).

Optionally, in some implementations, the scrambling code of the PBCH is a first scrambling code for indicating that the system information of the first cell is not updated, or the scrambling code of the PBCH is a second scrambling code for indicating that the system information of the first cell is updated, wherein the second scrambling code is different from the first scrambling code.

Optionally, in some implementations, the scrambling code information of the PBCH is generated according to specific information, the first scrambling code is determined by the specific information taking a first information value, and the second scrambling code is determined by the specific information taking a second information value, wherein the first information value is different from the second information value.

Optionally, in some implementations, the specific information includes an initial value of a gold sequence c(n) for generating a scrambling code sequence of the PBCH, wherein n is an integer.

Optionally, in some implementations, the first information value is $N_{ID}^{cell}$, $N_{ID}^{cell}$ is an Identity (ID) of a cell, and the second information value is $N_{ID}^{cell}$ plus a first offset.

Optionally, in some implementations, the first offset is preset.

Optionally, the specific information includes an input parameter of a gold sequence c(n) for generating the scrambling code sequence $S_i$ of the PBCH, here i=0, 1, 2, . . . , A−1, where A is a length of the scrambling code sequence of the PBCH and n is an integer.

Optionally, in some implementations, the specific information is the input parameter n of c(n), the first information value is j+vM and the second information value is j+vM+x, herein x is a second offset, here j=0, 1, 2, . . . , A−1, and M is determined according to A and the number of synchronization signal blocks (SSB), and the value of v is determined according to the second and third least significant bits of a system frame number (SFN) carried by the PBCH.

Optionally, in some implementations, the second offset is preset.

Optionally, the specific information is value of v in the input parameter of c(n), the first information value is a first value of v, and the second information value is a second value of v, herein the first value of v is different from the second value of v, and the value of v is determined according to the second and third least significant bits of the system frame number (SFN) carried by the PBCH.

Optionally, in some implementations, the first value of v is determined according to a first mapping relationship, and the second value of v is determined according to a second mapping relationship, herein the first mapping relationship and the second mapping relationship are mapping relationships between the second and third least significant bits of the SFN and values of v; herein for the same second and third least significant bits, the corresponding values of v in the first mapping relationship and the second mapping relationship are different.

Optionally, in some implementations, the first indication information is carried in a Physical Downlink Control Channel (PDCCH).

Optionally, in some implementations, the PDCCH is the PDCCH for scheduling the System Information Block (SIB).

Optionally, the Downlink Control Information (DCI) of the PDCCH includes the first indication information.

Optionally, in some implementations, the determination module is specifically configured to determine that the system information of the first cell is not updated within a first time window if the first indication information indicates that the system information of the first cell is not updated, herein a length of the first time window is a first duration.

Optionally, a time position of the first time window is determined based on a time position of the first indication information.

Optionally, in some implementations, the time position of the first time window includes an end time of the first time window, the time position of the first indication information includes a receiving time of the first indication information, and the end time of the first time window is the receiving time of the first indication information.

Optionally, in some implementations, the communication module is specifically configured to receive the first indication information sent by the network device of the first cell if the terminal device reselects to the first cell.

Optionally, in some implementations, the first indication information is carried in a Physical Downlink Shared Channel (PDSCH) or a PDCCH for scheduling paging messages.

Optionally, in some implementations, the PDSCH is a PDSCH for transmitting paging messages.

Optionally, in some implementations, the communication module is further configured to receive first indication information sent by a network device of a second cell, herein the second cell is different from the first cell.

Optionally, in some implementations, the determination module is specifically configured to determine that the system information of the first cell is not updated within a second time window if the first indication information indicates that the system information of the first cell is not updated, herein a length of the second time window is the first duration.

Optionally, a time position of the second time window is determined based on the time position of the first indication information.

Optionally, in some implementations, the time position of the second time window includes an end time of the second time window, the time position of the first indication information includes a receiving time of the first indication information, and the end time of the second time window is the receiving time of the first indication information.

Optionally, in some implementations, the time position of the second time window includes a starting time of the second time window, the time position of the first indication information includes the receiving time of the first indication information, and the starting time of the second time window is the receiving time of the first indication information.

Optionally, in some implementations, the first duration is preset or configured by a network device.

Optionally, the first duration is configured through system information, Radio Resource Control (RRC) signaling or DCI.

Optionally, the system information is MIB or Residual Minimum System Information (RMSI).

Optionally, the terminal device is configured with multiple durations, and the multiple durations include the first duration.

Optionally, the multiple durations are configured by a network device or pre-configured.

Optionally, the multiple durations are configured through broadcast signaling, RRC signaling or DCI.

Optionally, in some implementations, the communication module is further configured to receive an activation signaling, wherein the activation signaling is used for activating the first duration among the multiple durations.

Optionally, in some implementations, the activation signaling is DCI.

Optionally, in some implementations, the terminal device stores the system information of the first cell obtained when the terminal device camped on the first cell last time.

Optionally, in some implementations, the first duration is greater than or equal to the duration between the last time when the terminal device left the first cell and the time when the terminal device reselected to the first cell.

Optionally, in some implementations, the terminal device further includes: a processing module, configured to reuse the system information of the first cell stored by the terminal device if it is determined that the system information of the first cell is not updated.

Optionally, in some implementations, the system information of the first cell includes at least one of the following: MIB, RMSI and other system information.

It should be understood that the terminal device 400 according to the implementation of the present application may correspond to the terminal device in the method implementation of the present application, and the above-mentioned and other operations and/or functions of various units in the terminal device 400 are respectively used for implementing the corresponding processes of the terminal device in the method 200 shown in FIG. 3, which will not be repeated here for brevity.

FIG. 6 is a schematic block diagram of a network device according to an implementation of the present application. The network device 500 shown in FIG. 6 includes:
  a communication module 510 configured to send first indication information, herein the first indication information is used for indicating whether system information of a first cell is updated, and the first indication information is used by a terminal device to determine, according to a first duration, whether the system information of the first cell is updated.

Optionally, in some implementations, the first indication information is carried in a main information block (MIB).

Optionally, in some implementations, the first indication information includes K bits, herein the K bits take a first value for indicating that the system information of the first cell is updated, and the K bits take a second value for indicating that the system information of the first cell is not updated, herein the first value is different from the second value, and K is a positive integer.

Optionally, the first indication information includes scrambling code information of a Physical Broadcast Channel (PBCH).

Optionally, in some implementations, the scrambling code of the PBCH is a first scrambling code for indicating that the system information of the first cell is not updated, or the scrambling code of the PBCH is a second scrambling code for indicating that the system information of the first cell is updated, herein the second scrambling code is different from the first scrambling code.

Optionally, in some implementations, the scrambling code information of the PBCH is generated according to specific information, the first scrambling code is determined by the specific information taking a first information value, and the second scrambling code is determined by the specific information taking a second information value, herein the first information value is different from the second information value.

Optionally, in some implementations, the specific information includes an initial value of a gold sequence c(n) for generating a scrambling code sequence of the PBCH, wherein n is an integer.

Optionally, in some implementations, the first information value is $N_{ID}^{cell}$, $N_{ID}^{cell}$ is an Identity (ID) of a cell, and the second information value is $N_{ID}^{cell}$ plus a first offset.

Optionally, in some implementations, the first offset is preset.

Optionally, the specific information includes an input parameter of a gold sequence c(n) for generating the scrambling code sequence $S_i$ of PBCH, herein i=0, 1, 2, . . . , A−1, here A is a length of the scrambling code sequence of the PBCH and n is an integer.

Optionally, the specific information is the input parameter n of c(n), the first information value is j+vM and the second information value is j+vM herein x is a second offset, here j=0, 1, 2, . . . , A−1, and M is determined according to A and the number of synchronization signal blocks SSB, and the value of v is determined according to the second and third least significant bits of the system frame number (SFN) carried by the PBCH.

Optionally, the second offset is preset.

Optionally, the specific information is the value of v in the input parameter of c(n), the first information value is a first value of v, and the second information value is a second value of v, herein the first value of v is different from the second value of v, and the value of v is determined according to the second and third least significant bits of the system frame number (SFN) carried by the PBCH.

Optionally, the first value of v is determined according to a first mapping relationship, and the second value of v is determined according to a second mapping relationship, herein the first mapping relationship and the second mapping relationship are mapping relationships between the second and third least significant bits of the SFN and values of v; herein for the same second and third least significant bits, the corresponding values of v in the first mapping relationship and the second mapping relationship are different.

Optionally, the first indication information is carried in a Physical Downlink Control Channel (PDCCH).

Optionally, the PDCCH is a PDCCH for scheduling a System Information Block (SIB).

Optionally, Downlink Control Information (DCI) of the PDCCH includes the first indication information.

Optionally, if the first indication information is used for indicating that the system information of the first cell is not updated, the first duration is used for determining a first time window, herein a length of the first time window is the first duration.

Optionally, a time position of the first time window is determined based on a time position of the first indication information.

Optionally, the time position of the first time window includes an end time of the first time window, the time position of the first indication information includes a receiving time of the first indication information, and the end time of the first time window is the receiving time of the first indication information.

Optionally, the network device is a network device in the first cell.

Optionally, the first indication information is carried in a Physical Downlink Shared Channel (PDSCH) or a PDCCH for scheduling paging messages.

Optionally, the PDSCH is a PDSCH for transmitting paging messages.

Optionally, the network device is a network device of a second cell, wherein the second cell is different from the first cell.

Optionally, if the first indication information is used for indicating that the system information of the first cell is not updated, the first duration is used for determining a second time window, wherein a length of the second time window is the first duration.

Optionally, a time position of the second time window is determined based on the time position of the first indication information.

Optionally, the time position of the second time window includes an end time of the second time window, the time position of the first indication information includes the receiving time of the first indication information, and the end time of the second time window is the receiving time of the first indication information.

Optionally, the time position of the second time window includes a starting time of the second time window, the time position of the first indication information includes the receiving time of the first indication information, and the starting time of the second time window is the receiving time of the first indication information.

Optionally, the first duration is preset or configured by a network device.

Optionally, the first duration is configured through system information, Radio Resource Control (RRC) signaling or DCI.

Optionally, the system information is MIB or Residual Minimum System Information (RMSI).

Optionally, the terminal device is configured with multiple durations, and the multiple durations include the first duration.

Optionally, the multiple durations are configured by the network device or pre-configured.

Optionally, the multiple durations are configured through broadcast signaling, RRC signaling or DCI.

Optionally, the communication module is further configured for: sending an activation signaling, wherein the activation signaling is used for activating the first duration among the multiple durations.

Optionally, the activation signaling is DCI.

Optionally, the first duration is greater than or equal to a duration between last time when the terminal device left the first cell and the time when the terminal device reselected to the first cell.

Optionally, the system information of the first cell includes at least one of the following:

MIB, RMSI or other system information.

It should be understood that the network device 500 according to the implementation of the present application may correspond to the terminal device in a method implementation of the present application, and the above-mentioned and other operations and/or functions of various units in the network device 500 are respectively for implementing the corresponding processes of the network device in the method 300 as shown in FIG. 4, which will not be repeated here for brevity.

Figure 7:
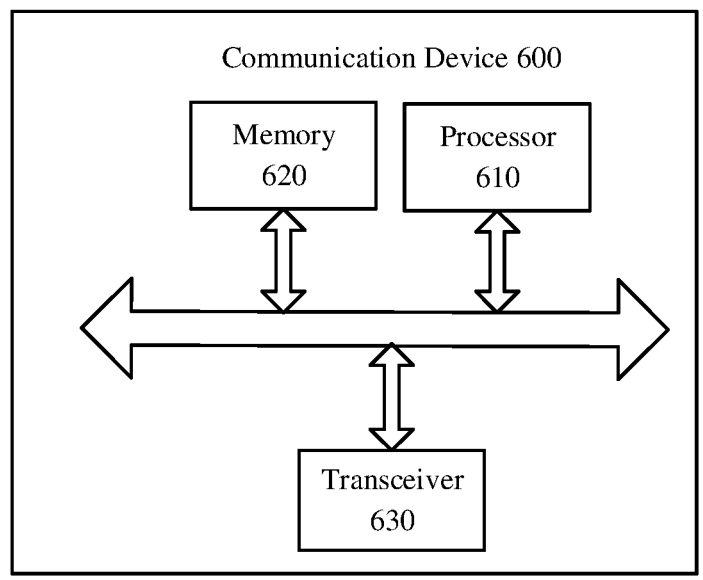
FIG. 7 is a schematic block diagram of a communication device according to another implementation of the present application.

FIG. 7 is a schematic diagram of a structure of a communication device 600 according to an implementation of the present application. The communication device 600 shown in FIG. 7 includes a processor 610, which may call and run a computer program from a memory to implement a method in an implementation of the present application.

Optionally, as shown in FIG. 7, the communication device 600 may further include a memory 620. Herein, the processor 610 may call and run a computer program from the memory 620 to implement the methods in the implementations of the present application.

Herein, the memory 620 may be a separate device independent of the processor 610, or may be integrated in the processor 610.

Optionally, as shown in FIG. 7, the communication device 600 may further include a transceiver 630, and the processor 610 may control the transceiver 630 to communicate with another device. Specifically, the transceiver 730 may send information or data to other devices or receive information or data sent from another device.

Herein, the transceiver 630 may include a transmitter and a receiver. The transceiver 630 may further include antennas, a number of which may be one or more.

Optionally, the communication device 600 may be specifically a network device according to an implementation of the present application, and the communication device 600 may implement the corresponding processes implemented by the network device in various methods of the implementations of the present application, which will not be repeated here for brevity.

Optionally, the communication device 600 may be specifically a mobile terminal/terminal device according to an implementation of the present application, and the communication device 600 may implement the corresponding processes implemented by the mobile terminal/terminal device in various methods of the implementations of the present application, which will not be repeated here for brevity.

Figure 8:
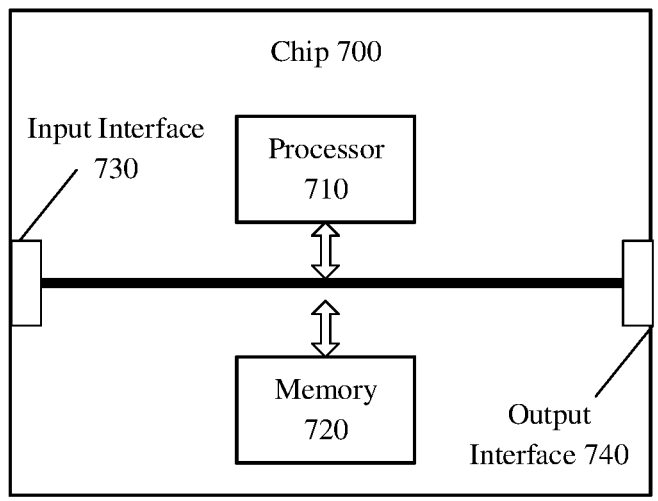
FIG. 8 is a schematic block diagram of a chip according to an implementation of the present application.

FIG. 8 is a schematic diagram of a structure of a chip according to an implementation of the present application. The chip 700 shown in FIG. 8 includes a processor 710, wherein the processor 710 may call and run a computer program from a memory to implement a method in an implementation of the present application.

Optionally, as shown in FIG. 8, the chip 700 may further include a memory 720. Herein, the processor 710 may call and run a computer program from the memory 720 to implement a method in an implementation of the present application.

Herein, the memory 720 may be a separate component independent of the processor 710, or may be integrated in the processor 710.

Optionally, the chip 700 may further include an input interface 730. Herein, the processor 710 may control the input interface 730 to communicate with another device or chip. Specifically, the processor 710 may acquire information or data sent from another device or chip.

Optionally, the chip 700 may further include an output interface 740. Herein, the processor 710 may control the output interface 740 to communicate with another devices or chip. Specifically, the processor 710 may output information or data to another devices or chip.

Optionally, the chip may be applied to a network device in an implementation of the present application, and the chip may implement the corresponding processes implemented by the network device in the various methods of the implementations of the present application, which will not be repeated here for brevity.

Optionally, the chip may be applied to a mobile terminal/terminal device in the implementations of the present application, and the chip may implement the corresponding processes implemented by the mobile terminal/terminal device in the various methods of the implementations of the present application, which will not be repeated here for brevity.

It should be understood that the chip mentioned in the implementations of the present application may also be referred to as a system-level chip, a system chip, a chip system, or a system on chip, etc.

Figure 9:
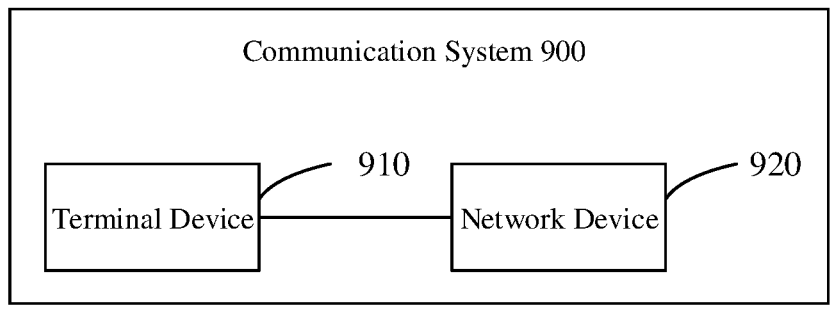
FIG. 9 is a schematic block diagram of a communication system according to an implementation of the present application.

FIG. 9 is a schematic block diagram of a communication system 900 according to an implementation of the present application. As shown in FIG. 9, the communication system 900 includes a terminal device 910 and a network device 920.

The terminal device 910 may be used for implementing the corresponding functions implemented by the terminal device in the above-mentioned methods, and the network device 920 may be used for implementing the corresponding functions implemented by the network device in the above-mentioned methods, which will not be repeated here for brevity.

It should be understood that the processor in the implementations of the present application may be an integrated circuit chip with a capability for processing signals. In an implementation process, various acts of the method implementations described above may be completed through an integrated logic circuit of hardware in a processor or instructions in a form of software. The above processor may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement various methods, acts, and logic block diagrams disclosed in the implementations of the present application. The general purpose processor may be a microprocessor or the processor may be any conventional processor or the like. The acts of the methods disclosed in connection with the implementations of the present application may be directly embodied by execution of a hardware decoding processor, or by execution of a combination of hardware and software modules in a decoding processor. The software modules may be located in a storage medium mature in the field, such as a Random Access Memory, a flash memory, a Read-Only Memory, a Programmable Read-Only Memory, or an electrically erasable programmable memory, or a register. The storage medium is located in a memory, and a processor reads information in the memory and completes the acts of the above methods in combination with its hardware.

It should be understood that the memory in the implementations of the present application may be a transitory memory or a non-transitory memory, or may include both transitory and non-transitory memory. The non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM) which serves as an external cache. As an example, but not as a limitation, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memories of the systems and methods described herein are intended to include, but are not limited to, these and any other suitable types of memories.

It should be understood that, the foregoing memories are examples for illustration and should not be construed as limitations. For example, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, the memories in the implementations of the present application are intended to include, but are not limited to, these and any other suitable types of memories.

An implementation of the present application further provides a computer readable storage medium configured to store a computer program.

Optionally, the computer readable storage medium may be applied to a network device in an implementation of the present application, and the computer program enables a computer to perform the corresponding processes implemented by the network device in various methods of the implementations of the present application, which will not be repeated here for brevity.

Optionally, the computer readable storage medium may be applied to a mobile terminal/terminal device in an implementation of the present application, and the computer program enables a computer to perform the corresponding processes implemented by the mobile terminal/terminal device in various methods of the implementations of the present application, which will not be repeated here for brevity.

An implementation of the present application further provides a computer program product, including computer program instructions.

Optionally, the computer program product may be applied to a network device in an implementation of the present application, and the computer program instructions enable a computer to perform the corresponding processes implemented by the network device in various methods of the implementations of the present application, which will not be repeated here for brevity.

Optionally, the computer program product may be applied to a mobile terminal/terminal device in an implementation of the present application, and the computer program instructions enable a computer to perform the corresponding processes implemented by the mobile terminal/terminal device in various methods of the implementations of the present application, which will not be repeated here for brevity.

An implementation of the present application further provides a computer program.

Optionally, the computer program may be applied to a network device in an implementation of the present application. When the computer program is run on a computer, the computer is enabled to perform the corresponding processes implemented by the network device in various methods of the implementations of the present application, which will not be repeated here for brevity.

Optionally, the computer program may be applied to a mobile terminal/terminal device in an implementation of the present application. When the computer program is run on a computer, the computer is enabled to perform the corresponding processes implemented by the mobile terminal/terminal device in various methods of the implementations of the present application, which will not be repeated here for brevity.

Those of ordinary skills in the art will recognize that units and algorithm acts of various examples described in connection with the implementations disclosed herein may be implemented in electronic hardware, or a combination of computer software and electronic hardware. Whether these functions are implemented in a form of hardware or software depends on a specific application and a design constraint of a technical solution. Those skilled in the art may use different methods to implement the described functions for each particular application, but such implementation should not be considered to be beyond the scope of the present application.

Those skilled in the art may clearly understand that for convenience and conciseness of description, specific working processes of the systems, apparatuses, and units described above may refer to the corresponding processes in the aforementioned method implementations, and details will not be repeated here.

In several implementations provided by the present application, it should be understood that the disclosed systems, apparatuses and methods may be implemented in other ways. For example, the apparatus implementations described above are only illustrative, for another example, a division of the units is only a logical function division, and there may be other division manners in actual implementation. For example, multiple units or components may be combined or integrated into another system, or some features may be ignored or not executed. In addition, mutual coupling or direct coupling or communication connection shown or discussed may be indirect coupling or communication connection through some interfaces, apparatuses, or units, and may be in electrical, mechanical, or other forms.

The units described as separated components may or may not be physically separated, and components shown as units may or may not be physical units, i.e., they may be located in one place or may be distributed over multiple network units. Some or all of the units may be selected according to practical needs to achieve purposes of solutions of the implementations.

In addition, various functional units in various implementations of the present application may be integrated in one processing unit, or various units may be physically present separately, or two or more units may be integrated in one unit.

The functions may be stored in a computer readable storage medium if implemented in a form of a software functional unit and sold or used as a separate product. Based on such understanding, technical solutions of the present application, in essence, or a part contributing to the existing art, or part of the technical solutions, may be embodied in a form of a software product stored in a storage medium, including several instructions for enabling a computer device (which may be a personal computer, a server, or a network device, etc.) to perform all or part of the acts of the methods described in various implementations of the present application. And the aforementioned storage medium includes: various media, such as a U disk, a mobile hard disk, a Read-Only Memory (ROM), a Random Access Memory (RAM), a magnetic disk, or an optical disk, etc., which may store program codes.

The foregoing are merely specific implementations of the present application, but the protection scope of the present application is not limited thereto. Any person skilled in the art may readily conceive variations or substitutions within the technical scope disclosed by the present application, which should be included within the protection scope of the present application. Therefore, the protection scope of the present application should be subject to the protection scope of the claims.

What is claimed is:

1. A method for wireless communication, comprising:
receiving, by a terminal device, first indication information, wherein the first indication information is used for indicating whether system information of a first cell is updated; and
determining, by the terminal device, whether the system information of the first cell is updated according to the first indication information and a first duration; wherein the first indication information comprises scrambling code information of a Physical Broadcast Channel (PBCH); wherein a scrambling code of the PBCH is a first scrambling code for indicating that the system information of the first cell is not updated, or the scrambling code of the PBCH is a second scrambling code for indicating that the system information of the first cell is updated, wherein the second scrambling code is different from the first scrambling code.

2. The method of claim 1, wherein the first indication information is carried in a main information block (MIB).

3. The method of claim 1, wherein the first indication information is carried in a Physical Downlink Control Channel (PDCCH).

4. The method of claim 3, wherein the PDCCH is a PDCCH for scheduling a System Information Block (SIB).

5. The method of claim 1, wherein the first indication information is carried in a Physical Downlink Shared Channel (PDSCH) or a PDCCH for scheduling a paging message.

6. A method for wireless communication, comprising:
sending, by a network device, first indication information, wherein the first indication information is used for indicating whether system information of a first cell is updated, and the first indication information is used by a terminal device to determine, according to a first duration, whether the system information of the first cell is updated; wherein the first indication information comprises scrambling code information of a Physical Broadcast Channel (PBCH); wherein a scrambling code of the PBCH is a first scrambling code for indicating that the system information of the first cell is not updated, or the scrambling code of the PBCH is a second scrambling code for indicating that the system information of the first cell is updated, wherein the second scrambling code is different from the first scrambling code.

7. The method of claim 6, wherein the first indication information is carried in a main information block (MIB).

8. The method of claim 7, wherein the first indication information comprises K bits, the K bits take a first value for indicating that the system information of the first cell is updated, or the K bits take a second value for indicating that the system information of the first cell is not updated, wherein the first value is different from the second value, and K is a positive integer.

9. The method of claim 6, wherein the first indication information is carried in a Physical Downlink Control Channel (PDCCH).

10. The method of claim 9, wherein Downlink Control Information (DCI) of the PDCCH comprises the first indication information.

11. The method of claim 6, wherein, if the first indication information is used for indicating that the system information of the first cell is not updated, and the first duration is used for determining a first time window, wherein a length of the first time window is the first duration.

12. The method of claim 11, wherein a time position of the first time window is determined based on a time position of the first indication information.

13. The method of claim 6, wherein the first indication information is carried in a Physical Downlink Shared Channel (PDSCH) or a PDCCH for scheduling a paging message.

14. A terminal device, comprising a processor and a transceiver, wherein:
the transceiver is configured to receive first indication information, wherein the first indication information is used for indicating whether system information of a first cell is updated; and
the processor is configured to determine, according to the first indication information and a first duration, whether the system information of the first cell is updated; wherein the first indication information comprises scrambling code information of a Physical Broadcast Channel (PBCH); wherein a scrambling code of the PBCH is a first scrambling code for indicating that the system information of the first cell is not updated, or the scrambling code of the PBCH is a second scrambling code for indicating that the system information of the first cell is updated, wherein the second scrambling code is different from the first scrambling code.

15. The terminal device of claim 14, wherein the first indication information is carried in a main information block (MIB).

16. The terminal device of claim 14, wherein the first indication information is carried in a Physical Downlink Control Channel (PDCCH).

17. The terminal device of claim 14, wherein the first indication information is carried in a Physical Downlink Shared Channel (PDSCH) or a PDCCH for scheduling a paging message.

18. The terminal device of claim 17, wherein the transceiver is further configured to:
receive the first indication information sent by a network device of a second cell, wherein the second cell is different from the first cell; and wherein the processor is specifically configured to:
determine that the system information of the first cell is not updated within a second time window if the first indication information indicates that the system information of the first cell is not updated, wherein a length of the second time window is the first duration.

* * * * *